Feb. 10, 1931.  J. P. PETERS  1,792,443
METHOD AND APPARATUS FOR WORKING, MOLDING, OR SHAPING
DOUGH OR THE LIKE PLASTIC SUBSTANCES
Filed Oct. 31, 1928   6 Sheets-Sheet 1

OLD FORM

J. P. Peters
INVENTOR

By: Marks & Clerk
ATTYS.

Feb. 10, 1931. J. P. PETERS 1,792,443
METHOD AND APPARATUS FOR WORKING, MOLDING, OR SHAPING
DOUGH OR THE LIKE PLASTIC SUBSTANCES
Filed Oct. 31, 1928 6 Sheets-Sheet 4

J. P. Peters
INVENTOR

By: Marks & Clark
ATTYS.

J. P. Peters
INVENTOR

By Marks & Clark
Attys.

Feb. 10, 1931.  J. P. PETERS  1,792,443
METHOD AND APPARATUS FOR WORKING, MOLDING, OR SHAPING
DOUGH OR THE LIKE PLASTIC SUBSTANCES
Filed Oct. 31, 1928   6 Sheets-Sheet 6

J. P. Peters
INVENTOR

Patented Feb. 10, 1931

1,792,443

UNITED STATES PATENT OFFICE

JOHANNES PHILIPPUS PETERS, OF ROTTERDAM, NETHERLANDS

METHOD AND APPARATUS FOR WORKING, MOLDING, OR SHAPING DOUGH OR THE LIKE PLASTIC SUBSTANCES

Application filed October 31, 1928, Serial No. 316,266, and in the Netherlands August 30, 1928.

The present invention relates to a method and apparatus for working, molding or shaping dough or the like plastic substances.

Figure 1:
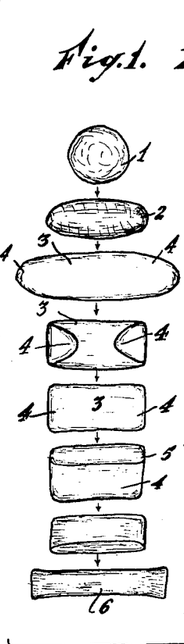
Figures 1 and 2 illustrate the known method of working, molding or shaping dough.
Figure 2:
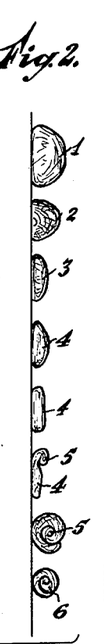

In order that the invention may be understood, the method which up to the present has generally been adopted will first be described with reference to Figures 1 and 2 of the annexed drawings. The other figures subsequently will be explained herein.

When molding dough, the baker takes a partially proved ball of dough 1 and shapes it so as to obtain a piece of dough 2 which is pointed in a transverse direction. He takes hold of this piece of dough and stretches it widthwise so that a sheet is obtained which is extended in the direction of its width and the central portion 3 of which in plan view, shows curved ends, while the sides 4, 4 are pointed. These sides 4, 4 are then folded inwardly, whereupon the rear end of the dough at 5 is curled over and the folded sheet is rolled up into the form of a cylinder. The piece of dough is now ready for further proving and for baking.

Seeing that favourable results are obtained by this known manual method of procedure, efforts have been made to carry out the same method by means of machines, but as yet the machines proposed for the purpose have not justified expectations as regards efficiency.

After baking, the dough, which has been rolled into an elongated cylindrical form by the machines, gives a bread which in various respects is inferior to the bread molded by hand with the result that the machines, after being procured, have soon been discarded.

According to the invention, a new method for working, molding or shaping dough is proposed which, whether carried out by hand or mechanically, has the same favourable result.

This method consists in flattening a piece of dough, for instance a ball of dough, into elongated form in the intended rolling direction, then folding inwardly the front side of the sheet obtained from such flattening, subsequently stretching the rear side and finally rolling up the complete mass into the form of a cylinder.

Prior to, during or after the folding operation the side edges are passed between stationary guide members.

For carrying this method into effect according to the invention a machine is constructed which is characterized by a roller-means for flattening and elliptically rolling out a ball of dough, means for folding back the leading rounded edge of the sheet, means for straightening out or stretching the rear edge of the sheet, means for curling over or rolling up the front end of the sheet and means for further rolling up the latter into a scroll.

Near the folding means, rollers may be mounted whereby the lateral edges of the dough are directed.

The above and other features of the invention will be more fully explained with reference to Figures 3–14, illustrating by way of example the method and a suitable apparatus for carrying it out.

Figure 3:
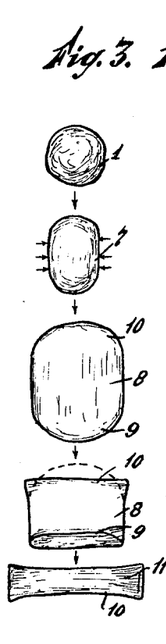
Figures 3 and 4 illustrate to which successive operations the dough is subjected.
Figure 4:
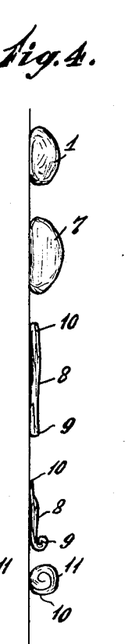

When carrying out the new method by hand (Figures 3 and 4), the baker places the ball 1 of dough in front of him and flattens it in the direction of the arrows in Figure 3, whereby a flattened piece of dough 7 is obtained. This piece of dough is shaped into a sheet of dough 8 which is elongated in the desired rolling direction and has rounded ends 9, 10. The front end 9 is then folded back and the rear end 10 is straightened out rectangularly, and flattened, whereby this end becomes somewhat wider than the remaining portion of the sheet of dough. The sheet is then rolled up into a scroll 11 having thickened heads, whereby the closure is accurately straight and nearly adjoining.

The enlarged rear end of the sheet of dough is desirable for obtaining a bread having a straight upper side and end faces as has appeared from experiments.

As a substitute for the approved but expensive hand method, the novel method is extremely suitable for producing an entirely equivalent product. Contrary to this mechanical method used up to now, the results of the new method when carried out mechanically are equivalent to those of the expensive but approved hand method of operation.

A drawback of the known mechanical method is that the flattened rounded piece of dough has to be rolled out to a sheet which is oval in the direction of its width, whereby the dough suffers too much in the machine. Moreover in some known machines the folding back of the ends 4, 4 is effected by hand whereafter the sheet is curled over and rolled into a scroll.

In the known mechanical method, the molding of the dough takes place less satisfactorily than by hand. The present result, however, is obtained by elimination of the known mechanical operations. Consequently, not only is the appearance of the dough, as mechanically molded up to the present time, inferior to that molded by hand, but moreover the fermentation is less intense in the mechanical molding operation and the interior structure of the dough is interfered with. The carbondioxide ($CO_2$) produced by the fermentation is enclosed by small elastic gluten cells and it is in particular due to the manner of rolling out that the cell walls in the dough are torn up and broken by pressure with the result that the dough becomes destroyed or damaged; this is called the "dooddrukken" of the dough. The final product, the baked bread, therefore shows all the disadvantages of this operation, it soon becomes dry, i. e. has the characteristic of becoming stale, and as a consequence decreased as regards eating qualities and taste.

By carrying out the method according to the invention the said torturing, overworking or deadening effect on the dough is avoided, so that a product is obtained which is equally as efficient as the handmade one.

Figure 5:
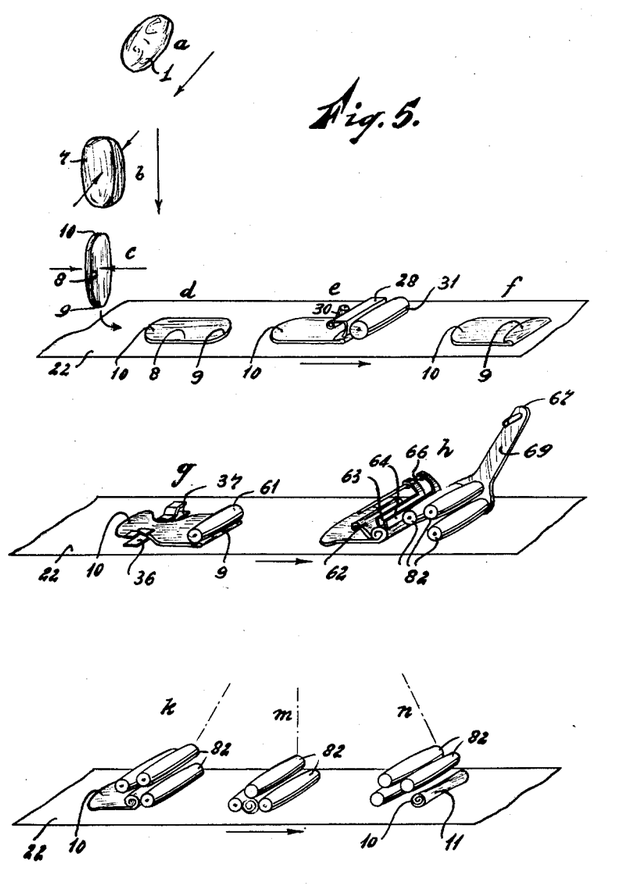
Figure 5 illustrates the mechanical application of the method.
Figure 6:
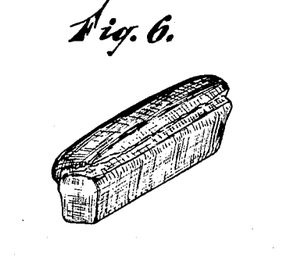
Figure 6 shows a bread such as obtained after the baking of a piece of dough mechanically molded according to the invention.

Figure 5 shows schematically the manner of mechanically carrying out the method according to the present invention. This figure serves at the same time as an illustration of the machine which will be described hereinafter.

The machine for carrying the method into effect and shown in Figures 7–14 comprises a frame 12 on which the various dough working devices are adjustably or non-adjustably mounted. The first device is an adjustable pair of rollers 13 co-operating with adjustable roller pairs 14 and 15, located underneath the former pair. These two latter pairs flatten the dough in the direction perpendicular to the flattening direction of the first pair of rollers. This roller mechanism is driven by an electromotor by means of a retarding mechanism or a variable change speed gear 16, the continuous rotating secondary shaft of which is indicated by 17. Upon this shaft is mounted a driving sprocket wheel 19 and an intermediate friction clutch 18; the clutch is normally operative and may be disengaged by means of a lever 20; 21 denotes a switch with starting resistance.

Underneath the roller mechanism a dough conveying belt 22 is passed over the rollers 23, 24, the roller 23 of which is continuously driven by the sprocket wheel 19. The conveying belt is passed with its upper portion over a table 25 and rollers 26 and 27 respectively. At the front, above the said belt portion, a folder 28 is freely pivotally mounted in supports 29. The folder bears at its lower ends on the conveying belt and is located between two freely rotatable upstanding rollers 30, 30. The folder and rollers are located in front of a cylindrical flattening roller 31, co-operating with the roller 26 located underneath the conveying belt. The shaft of this roller is provided with a gear-wheel 32 engaging a gear-wheel 33 in the shaft of the roller 26, which shaft also carries a sprocket wheel 34, that, by means of a chain, is driven by the sprocket wheel 23 mounted on the shaft 35.

Figure 11:
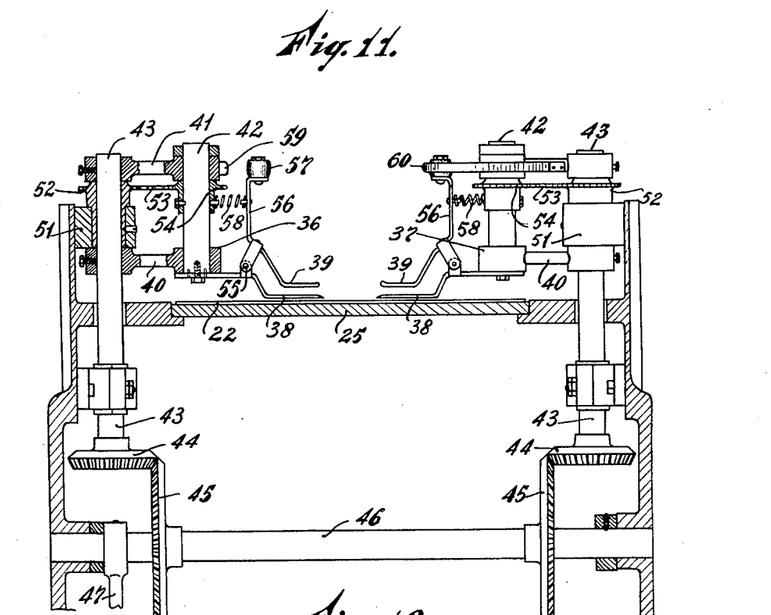
Figure 11 is a vertical cross section on the line XI—XI in Figure 7, with the gripping members in gripping position.
Figure 12:
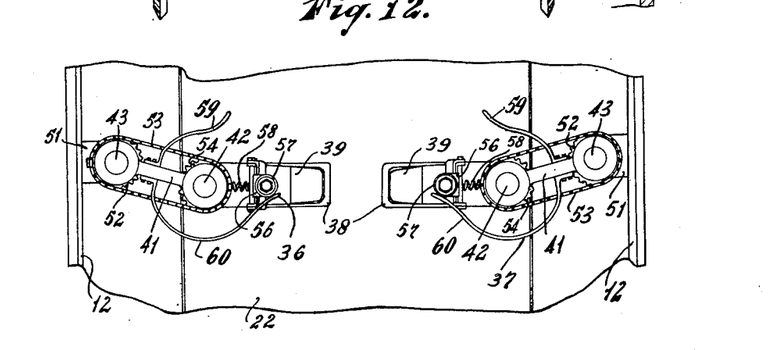
Figure 12 is a corresponding plan view.

At the rear of the roller 31 two automatically actuated gripping members 36, 37 (Figures 7, 8, 11 and 12) are arranged each comprising a stationary jaw 38 (Figures 11 and 12). The jaws are each mounted on a vertical spindle 42 rotatably secured to arms 40, 41 which are pivotally connected to a spindle 43. This spindle carries at its lower ends a bevel gear 44 co-operating with a larger bevel gear 45 on a shaft 46 to which a crank 47 is secured. To this crank, making a stroke of about 90° a rod 48 is connected which is actuated by a rotating crank 50, secured to a controlling shaft 49. The shaft 49 is provided with a sprocket wheel 89 which by means of a chain 90 is driven by the retarding mechanism 16. At each revolution of the crank 50, the spindle 43 is once rotated to and fro through 180° in which movement the arms 40, 41 participate.

Figure 13:
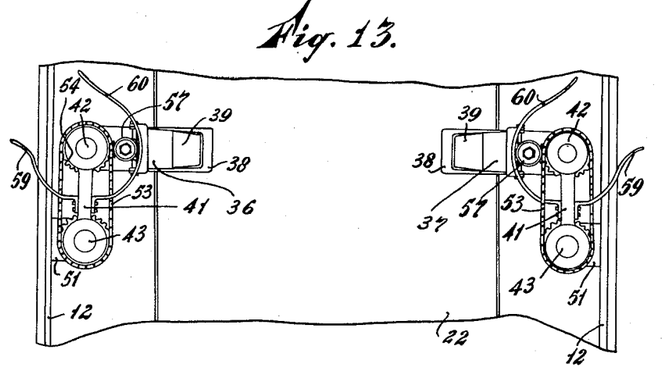
Figure 13 shows the gripping members in their foremost position.
Figure 14:
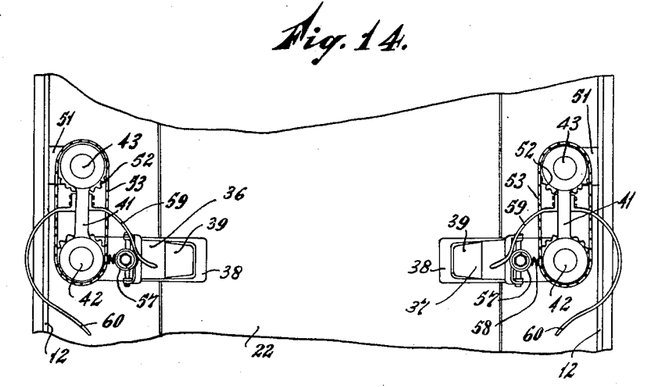
Figure 14 shows the said gripping members at the moment that they release the dough.

To the machine frame a block 51 is secured supporting the gripping members 36, 37 in which block the hub of a sprocket wheel 52 is clamped. A chain 53 is passed over this wheel 54 secured to the spindle 52 (Figures 13, 14).

The movable jaw 39 of each gripping member is at 55 hinged to the stationary jaw 38 and is extended upwardly so as to form an arm 56 carrying a steering roll 57 forced away from the spindle 42 by a spring 58. At either side of the arm 41 an arm 59 and 60 respectively is secured, determining the movements of the steering roll and thereby the opening and closing of the gripping member during the rotation of the crank 50 about the controlling shaft 49.

Behind the gripping members (Fig. 7) a roller 61 having a convex shape and co-operating with the roller 27 is arranged which serves to take hold of the dough extended by the gripping members and to roll it out centrally.

Immediately behind this roller three flaps 62, 63, 64 are arranged adapted to swing independently of each other about shafts 65 and 66 respectively. The flap 62 consists of a closed cap while the flaps 63, 64 each consist of narrow rigid or resilient strips provided with hinge arms.

Behind these flaps (Fig. 7) a yoke 67 is rockably mounted in the machine frame by means of a shaft 68. To this shaft, which forms a rigid connection between the yoke arms 69, 69 and is made hollow, a downwardly projecting arm 70 (Figs. 7 and 10) is attached which, by means of a pin 71, engages a slot in an arm 72. The arm 72 is rotatable about a pivot 73 and is provided with a transverse arm 74 which, by means of a pin, engages a slot 75 in the arm 76 of a bell crank lever 76, 77 fulcrumed at 78 and urged by a spring 79 with a roll 80 against a cam disc 81 mounted on the controlling shaft 49.

The movement of the yoke 67 is determined by the shape of this continuously rotating cam disc and is such that the yoke (Fig. 7) moves rapidly towards the left and back into the vertical position, dwells for some time in this position and then slowly swings to the right.

Between the rocking arms 69, 69 and immediately above the conveying belt 22, three somewhat convex rollers 82, 82 are circularly mounted. The shafts of these rollers are mounted with some play in the arms and project outside the one arm 69 and are driven in the direction of the arrow opposite to the direction of movement of the conveying belt 22 by a chain transmission 83, deriving its motion from a shaft 84, passing through the hollow yoke shaft 68 and provided with a sprocket wheel 85 driven by a chain 86 and a sprocket wheel 87 on the shaft 88 of the roller 26.

To the controlling shaft 49 carrying the driving crank for the gripping members and the cam disc for the yoke 67 a cam disc 91 is secured for controlling a drop valve 92 for the dough. This cam disc actuates the arm 94 of a bell crank lever 94, 95 fulcrumed at 96, the said arm 94 being provided with a roll 93. The arm 95 of this bell crank lever is connected to the lower end of a rod 97 at its upper end hinged to a crank 98 of a drop valve 92 adapted to tilt about pivots 99. A spring 100 tends to always bring the said valve in the position shown in which the dough falls between the rollers 13, 13. A guiding valve 101 serves to ensure that the dough drops centrally above the rollers 13, 13 and 14, 14.

Figure 7:
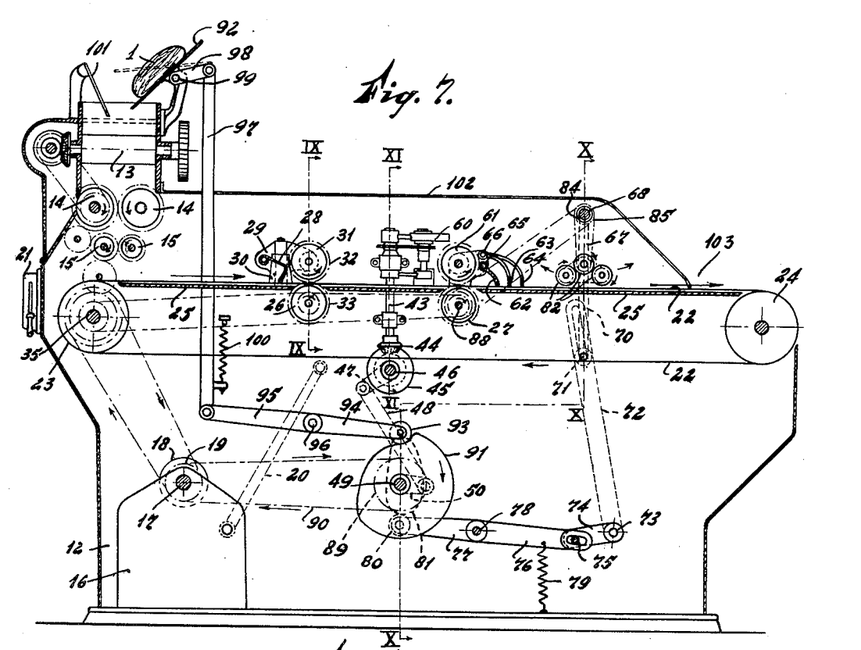
Figure 7 is a diagrammatical side elevation, in part a longitudinal section, of a machine according to the invention and viewed from the side where it is operated.
Figure 8:
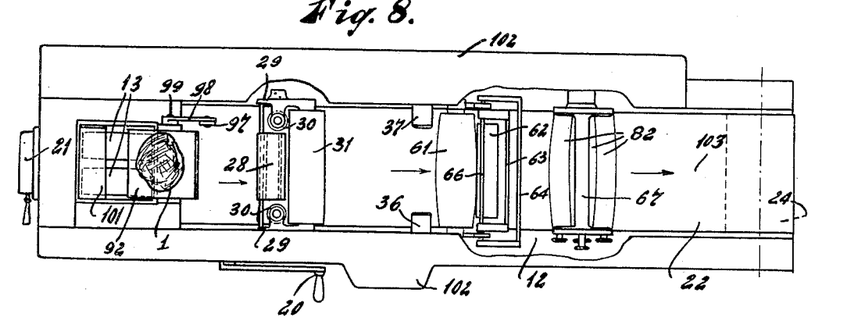
Figure 8 is a plan view, in part a section, of the machine according to Figure 7.
Figure 9:
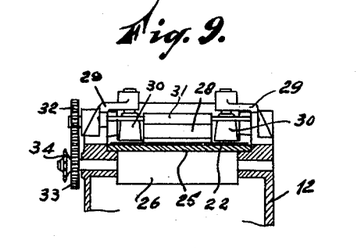
Figure 9 is a vertical cross-section on the line IX—IX in Figure 7.
Figure 10:
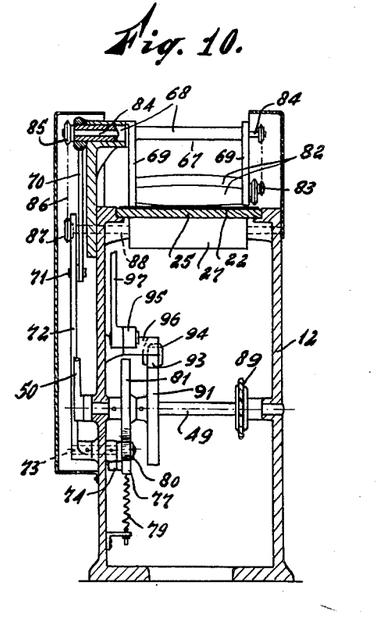
Figure 10 is a vertical cross-section on the line X—X in Figure 7 in which, for the sake of clearness, various parts are shown in another plane than in which they are really located.

The operation of the machine above described is as follows (see also Figure 5):

As soon as the cam disc 91 has reached the position shown in Fig. 7, the valve 92 is tilted and the ball of dough (Fig. 5a) placed thereupon by hand or mechanically falls between the rollers 13, 13. After having passed between these rollers, the now truncated ball-shaped piece of dough (Fig. 5b) is flattened so as to form an elongated sheet of dough (Figs. 5c and 5d) by the rollers 14, 14 and then by the rollers 15, 15. Thus shaped, the dough reaches the conveying belt 22 (Fig. 7) and the rounded front edge engages the flap 28 and is folded back thereby (Fig. 5e). Simultaneously the lateral edges are straightened and thereupon the folded front edge is flattened by a rolling operation (Fig. 7) prior to the dough having the opportunity of working back and prior to the flap 28 entirely releasing the fold. The dough (Fig. 5f) besides being provided with two straight lateral edges is now also provided with a straight front edge. Then the dough approaches the roller 61 and comes within the reach of the gripping members 36, 37. These members, moving in parallel, turn together with the dough inwardly from the foremost position (Fig. 14) to the rearmost position (Fig. 12). At the moment at which (Fig. 12) the arms 60 release the roller 57, the springs 58 press the jaws 39 downwardly, whereby the latter resiliently take hold of the piece of dough (Fig. 5g). During the further rotatory movement—together with the belt—the gripping members are holding the piece of dough and stretch it, whereby it is not only made larger and thinner at the rear end, but the rounded rear edge is also straightened out (Fig. 3). As soon as the arms 59 (Fig. 14)

force back again the rollers 57, the gripping members are opened and the piece of dough is released which then works somewhat back, which has been taken into account. The roller 61 holds the piece of dough during the stretching of the rear edge and finally flattens the dough. The piece of dough has now an entirely rectangular shape with a somewhat enlarged rear end.

The dough, while passing the roller 61, and being not yet released, engages at its front edge the first one of the flaps 62, 63, 64 (Fig. 5g) which are arranged in such a manner that they co-operate to curl over the front end gradually and produce a closed curl. The roller 61 contributes to carrying the sheet of dough forward with the belt against the reactive pressure of the flaps. Meanwhile the yoke 67 and the three rollers 82 are moved forwardly and these rollers take over, practically without interruption, the rolling of the piece of dough (Fig. 5k), the rollers moving into the vertical central position, dwell some time in this position (Fig. 5m) and then while slowly swinging to the right and rolling the dough (Fig. 5n), release the scroll of dough. This manner of rolling up does not interfere with the fermentation of the dough. The scroll of dough formed is now provided with heads which are somewhat thicker than the body of the scroll which is advantageous with regard to the shape of the bread. The closure (Fig. 4) will now be rectilinear and adjoins the scroll of dough smoothly, owing to the fact that the rollers are mounted with some play and may be provided with unevenesses which is favourable for the roller operation.

I claim:

1. A method of molding and shaping dough sheets of flattened elongated shape with the greatest dimension in the intended direction of rolling, consisting in folding back and pressing the front edge of the dough sheet flat, thinning and straightening the back edge, curling over and partly rolling the front edge of the dough sheet and immediately rolling up the sheet further to form a scroll.

2. A method as claimed in claim 1, characterized in guiding the dough piece during the folding over operation.

3. A method as claimed in claim 1, characterized in that during the thinning and straightening of the back edge of the dough sheet the latter is stretched in the direction of its width at a distance from its back edge.

4. A machine for molding and shaping dough comprising a rolling device, for flattening a ball of dough and rolling it into elongated shape with the greatest dimension in the intended direction of rolling, a conveying belt receiving the pieces of dough and carrying them along a series of molding devices comprising in succession a device for folding over and pressing down the front edge of the arriving sheet, a device for making the sheet at its back edge straight, thinner and also wider, a device for curling over and partly rolling up the front edge of the folded over sheet and a device for further rolling up the partly rolled up sheet into a long scroll.

5. A device for folding over the front edge portion of a sheet of dough in machines for molding or shaping dough, characterized by means comprising a conveying belt and a hook movably hinged above the said belt and a sheet front edge flattening roller, cooperating with the belt, arranged at the back of the hook and combined with means for driving it in timed relation with the said belt and a roller arranged at both sides of the hook, in front of the flattening roller, said side rollers adapted to rotate about vertical axes for the purpose of making the side edges of the sheets of dough substantially parallel to each other.

6. A device for handling the back portion of a sheet of dough in machines for molding or shaping dough, characterized by means comprising a conveying belt and a device arranged above the said belt for stretching the sheet in the direction of its width at the back edge portion thereof and for making the back edge of the said sheet more straight and thinner.

7. A device according to claim 6, characterized in this that at either side and above the conveying belt a gripper is arranged, comprising two jaws movable relatively to each other and adapted to be operated in such a manner that while moving in the direction of the belt, they approach at the same time the jaws of the other gripper, engage the sheet of dough, are subsequently closed, grip thereby the sheet and moving in closed condition away from each other and in the direction of the belt and are opened again when the dough is made sufficiently broader.

8. A device according to claim 6, characterized in this that at either side and above the conveying belt a gripper is arranged, comprising two jaws movable relatively to each other and adapted to be operated in such a manner that while moving in the direction of the belt, they approach at the same time the jaws of the other gripper, engage the sheet of dough, are subsequently closed, grip thereby the sheet and moving in closed condition away from each other and in the direction of the belt and are opened again when the dough is made sufficiently broader, each gripper comprising a jaw fixed relatively to an upright spindle carrying a sprocket wheel also fixed relatively thereto, the said sprocket wheel by means of a chain being connected to a sprocket wheel of a sleeve positioned in parallel relation to the spindle, through which sleeve a main spindle passes, receiving a forward and backward rotating movement, the spindle being provided with radial arms for supporting the spindle carrying the fixed jaw and having hingedly connected to it a movable jaw, cooperating with the fixed jaw and for its operating movement being controlled by controlling means arranged on the main spindle while for its closing movement the said jaw is spring-actuated.

9. A device according to claim 6, characterized in this that immediately at the back of the grippers a roller is arranged serving for holding the sheet of dough down on the conveying belt during the stretching operation.

10. A device for handling the front edge portion of a sheet of dough in a machine for molding dough, characterized by means comprising a conveying belt, a hook movably suspended above the said belt for curling over the front edge of the sheet, a second hook provided with an opening for the passage of the first mentioned hook and reaching in an opening of a third hook, which hooks come to rest on the curled over sheet with their lower edges at short distances behind each other.

11. A device according to claim 10, characterized in this that the axes of rotation of the second and third hook lie above the axis of rotation of the first book.

12. A device according to claim 10, characterized in this that the axes of rotation of the second and third hook lie above the axis of rotation of the first hook, the axes of rotation of the second and third hooks coinciding.

13. A device for handling the curled over and rolled up front portion of a sheet of dough in a machine for molding dough, characterized by means comprising a conveying belt and a series of rollers cooperating therewith to form a rolling chamber for further rolling the dough into roll-shape and rotatably arranged along a curve in a roller yoke, being oscillated by a suitable mechanism, such that the yoke is first moved back relatively to the belt for receiving a sheet of dough curled over at the front end, then moved in the direction of movement of the belt to the position wherein the rolling chamber is narrowed and finally further moved in the same sense for delivering the molded roll of dough.

14. A device according to claim 13, characterized in this that the roller yoke together with the rollers are coupled with the driving means in such a manner that the yoke remains stationary or almost stationary during the time that the rolling chamber is narrowest.

15. A device according to claim 13, characterized by driving means, driving the rollers of the yoke positively in the direction opposite to that of the conveying belt.

In testimony whereof I affix my signature.

JOHANNES PHILIPPUS PETERS.